May 27, 1958  GEORGE CARRILLO Z.  2,836,381
AIRPLANE WITH VARIABLE SWEEPBACK AIRFOILS
Filed Aug. 16, 1955  2 Sheets-Sheet 1
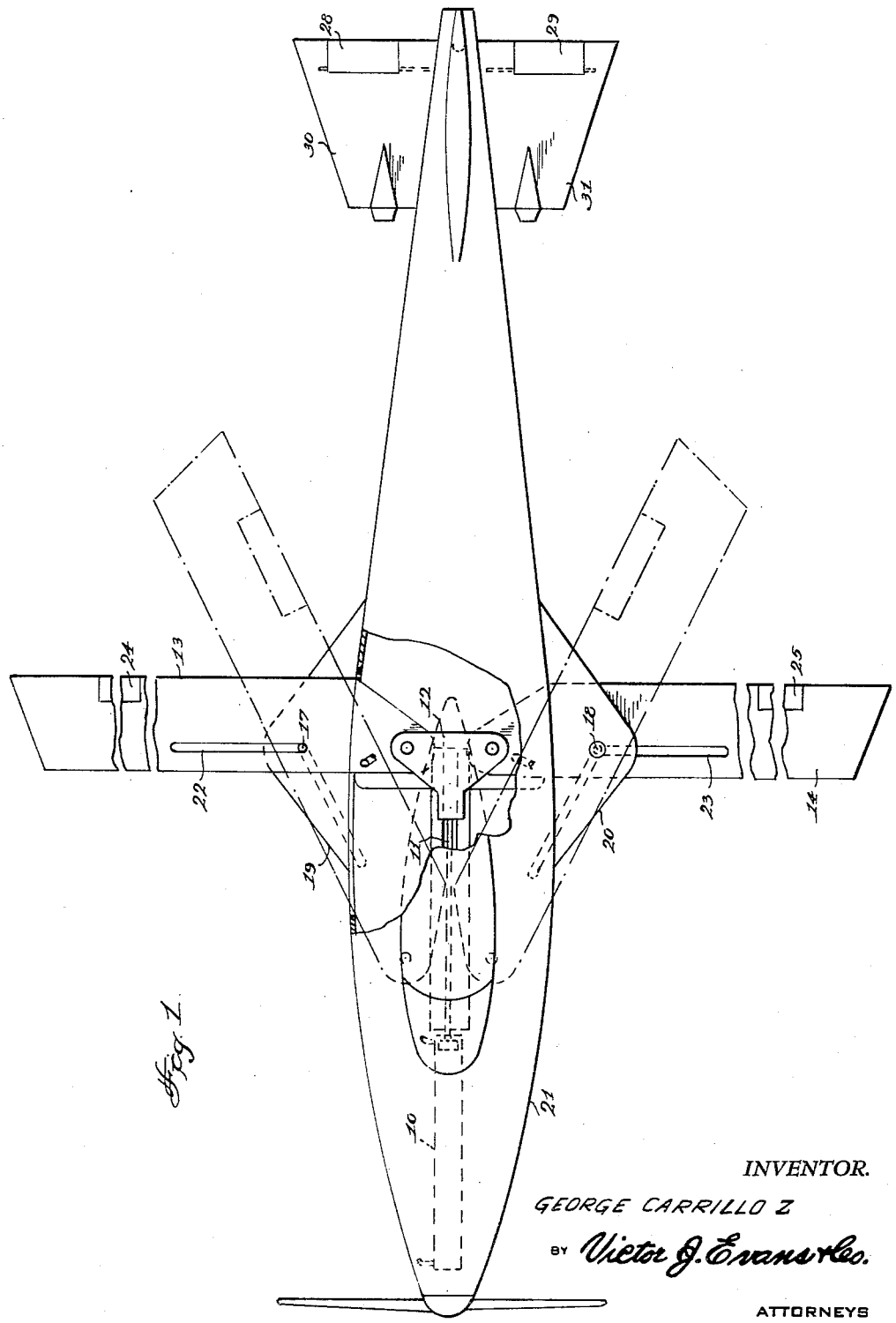
INVENTOR.
GEORGE CARRILLO Z
BY
ATTORNEYS

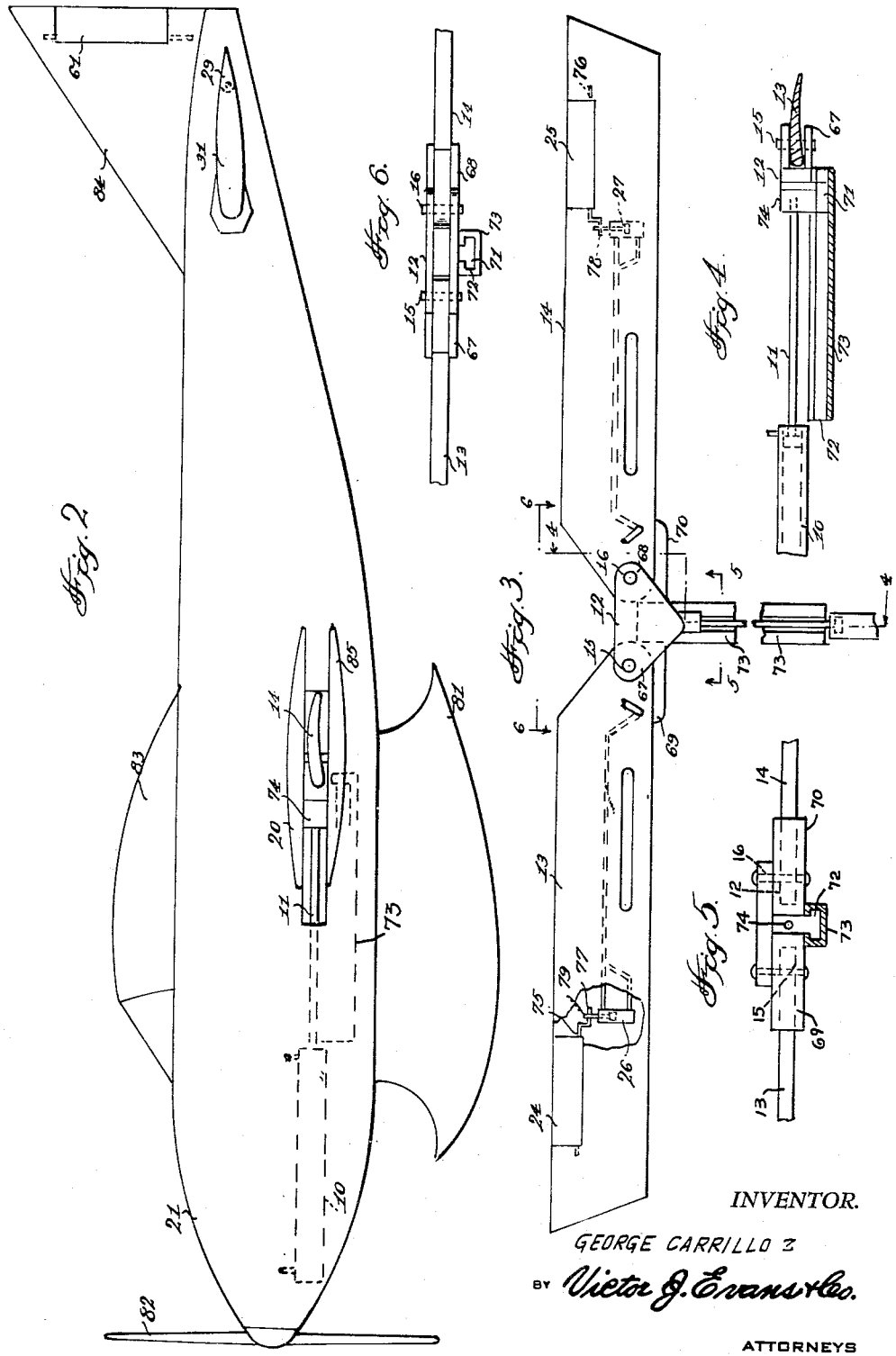

United States Patent Office 2,836,381
Patented May 27, 1958

2,836,381

AIRPLANE WITH VARIABLE SWEEPBACK AIRFOILS

George Carrillo Z, Bristol, Colo., assignor of one-half to P. Jess Rink

Application August 16, 1955, Serial No. 528,785

1 Claim. (Cl. 244—43)

This invention relates to airships of the rocket type wherein the wings extend outwardly for starting and wherein it is desired to retract or fold the wings to rearwardly inclined positions for traveling at high speed, and in particular, pivotally mounted wings actuated by a hydraulic cylinder through a crosshead slidably mounted in the fuselage and also in which ailerons in the trailing edges of the wings, elevators in the fins at the sides of the tail of the fuselage and also a rudder are actuated by hydraulic cylinders.

The purpose of this invention is to facilitate the control of rocket type airships by using a hydraulic cylinder for controlling positions of the wings, ailerons, elevators and rudder so that it is only necessary for the aviator to press a button to obtain substantially any degree of control desired.

It is substantially impossible for an aviator to manually move wings of an airship in flight and under certain conditions it is also impossible to operate the ailerons, elevators and rudders. With this thought in mind, this invention contemplates a traveling crosshead actuated by a hydraulic cylinder and connected to pivotally mounted wings with the parts assembled in the fuselage of an airship and in which substantially all of the controls are hydraulically actuated.

The object of this invention is, therefore, to provide means for installing a hydraulic control for actuating wings of an airship particularly of the rocket type and also means for providing hydraulic controls for the ailerons, elevators, and rudder.

Another object of the invention is to provide hydraulic control for pivotally mounted wings of an airship in which the mounting elements and connecting means are of rugged construction to prevent the wings working loose under shock loads.

With these and other objects and advantages in view, the invention embodies wings pivotally mounted on supports extended from sides of the fuselage of an airship with pivotal mounting pins extended through slots in which the wings are pivotally mounted on supports extended from sides of the fuselage of the aircraft with the pivotal mounting pins extended through the slots of the wings and with the inner ends of the wings extended into the fuselage and pivotally connected to a traveling crosshead which is adapted to be actuated by a hydraulic cylinder in the nose of the fuselage and also in which hydraulic cylinders are provided for actuating the ailerons of the trailing adges of the wings, elevators in the trailing edges of fins on the sides of the tail of the fuselage, and a rudder in a vertically disposed fin extended upwardly from the upper surface of the fuselage.

Other features and advantages of the invention will appear from the following description, taken in connection with the drawings, wherein:

Figure 1 is a plan view with parts broken away illustrating the relative positions of the parts and showing the wings extended straight outwardly in full lines and partly folded to rearwardly extended positions in broken lines.

Figure 2 is a side elevational view of an airship illustrating the wing mounting and the connection of the hydraulic cylinder thereto.

Figure 3 is a plan view of the wings of the airship with parts omitted and parts broken away illustrating the connection of inner ends of the wings to a piston rod extended from the hydraulic cylinder and also with parts of the upper surface of one wing broken away to show the hydraulic control cylinder for the ailerons of the wings.

Figure 4 is a longitudinal section taken on line 4—4 of Figure 3 illustrating a typical connection of the connecting rod of the cylinder to the crosshead to which the inner ends of the wings are pivotally attached.

Figure 5 is a cross section taken on line 5—5 of Figure 3 showing the track in which the crosshead travels.

Figure 6 is an elevational view looking toward the side of the wing assembly opposite to that from which Figure 5 is taken.

Referring now to the drawings, wherein like reference characters denote corresponding parts, the improved hydraulically controlled rocket type airship of this invention includes a cylinder 10 connected by a piston rod 11 to a crosshead 12, wings 13 and 14 pivotally connected to the crosshead with pins 15 and 16 and pivotally mounted with pins 17 and 18 in supports 19 and 20, respectively, on the sides of the fuselage 21. The pins 17 and 18 extend through slots 22 and 23, respectively, and ailerons 24 and 25 in the trailing edges of the wings are controlled by hydraulic cylinders 26 and 27, respectively.

The crosshead 12 is provided with bifurcated end sections 67 and 68 in which inner ends of the wings are pivotally mounted with the pins 15 and 16 and the forward end of the crosshead is provided with arms 69 and 70 that extend outwardly at right angles to the longitudinal axis of the fuselage, and being positioned in the path of the wings, provide stops to limit opening movements of the wings, as illustrated in Figure 3. The lower surface of the crosshead is provided with a T-shaped tongue 71 that is mounted to slide longitudinally in a groove 72 in a rail 73, as shown in Figures 4 and 6, whereby the rail provides a guide maintaining the crosshead on the longitudinal center of the airship. The piston rod 11 is secured in a section 74 of the crosshead 12, as shown in Figure 4.

The ailerons 24 and 25 are pivotally mounted by shafts 75 and 76 in the wings and inner ends of the shafts are provided with offset sections or cranks 77 and 78 to which piston rods 79 and 80 of the hydraulic cylinders 26 and 27 are connected. It will be understood, however, that such connections are only typical and other suitable connections may be used.

In the design shown, the rocket airship is provided with landing skids 81, a propeller 82, a cabin 83, and a vertically disposed fin 84 on the upper surface of the tail and in which the rudder 61 is mounted.

The control elements of this invention may be incorported in other suitable types of aircraft.

With the wings positioned between upper sections, to which the numeral 20 refers, and lower sections 85 of the support and securely mounted on the pins 17 and 18, which extend through the slots 22 and 23, the wings are braced vertically and are adapted to withstand extreme shock loads.

It will be understood that other modifications, within the scope of the appended claim, may be made in the design and arrangement of the parts without departing from the spirit of the invention.

What is claimed is:

In an aircraft, the combination which comprises a fuselage, sets of spaced supports extended laterally from each side of the fuselage, wings provided with spanwise slots in the inner sections thereof, the inner end of each wing being disposed between the supports of one of said sets, pins fixed on said supports and extending through said slots in pivotal and sliding relation to said wings, a crosshead pivotally connected to the inner ends of the wings, and means for displacing said crosshead longitudinally of the aircraft for retraction and extension of said wings.

References Cited in the file of this patent

UNITED STATES PATENTS

| | | |
|---|---|---|
| 1,864,236 | Evrard | June 21, 1932 |
| 1,935,004 | Winther | Nov. 14, 1933 |
| 2,293,644 | Gluhareff | Aug. 18, 1942 |
| 2,410,239 | Roe | Oct. 29, 1946 |

FOREIGN PATENTS

| | | |
|---|---|---|
| 613,382 | Great Britain | Nov. 25, 1948 |
| 695,026 | Great Britain | Aug. 5, 1953 |